(12) United States Patent
Lewis et al.

(10) Patent No.: US 11,284,637 B2
(45) Date of Patent: Mar. 29, 2022

(54) EGG-FREE SIMULATED EGG FOOD PRODUCTS

(71) Applicant: THE VEGGLETTO COMPANY PTY LIMITED, Bowral (AU)

(72) Inventors: Deborah Ann Lewis, Bowral (AU); David Adrian Lewis, Bowral (AU)

(73) Assignee: THE VEGGLETTO COMPANY PTY LIMITED, Bowral (AU)

( * ) Notice: Subject to any disclaimer, the term of this patent is extended or adjusted under 35 U.S.C. 154(b) by 0 days.

(21) Appl. No.: 16/618,014

(22) PCT Filed: May 31, 2018

(86) PCT No.: PCT/AU2018/050531
§ 371 (c)(1),
(2) Date: Nov. 27, 2019

(87) PCT Pub. No.: WO2018/218296
PCT Pub. Date: Dec. 6, 2018

(65) Prior Publication Data
US 2020/0187531 A1 Jun. 18, 2020

(30) Foreign Application Priority Data
Jun. 1, 2017 (AU) ................................ 2017902096

(51) Int. Cl.
*A23L 15/00* (2016.01)

(52) U.S. Cl.
CPC ............... *A23L 15/35* (2016.08); *A23L 15/20* (2016.08); *A23L 15/30* (2016.08)

(58) Field of Classification Search
CPC ........... A23L 15/35; A23L 15/20; A23L 15/30
USPC ....................................................... 426/656
See application file for complete search history.

(56) References Cited

U.S. PATENT DOCUMENTS

| 2002/0132287 | A1 | 9/2002 | Appu et al. | |
| 2004/0166230 | A1* | 8/2004 | Bodor | A23J 1/09 426/656 |
| 2006/0073259 | A1* | 4/2006 | Kato | A23L 7/143 426/622 |
| 2013/0052304 | A1 | 2/2013 | Li | |
| 2014/0113013 | A1 | 4/2014 | Samoto et al. | |
| 2014/0193565 | A1 | 7/2014 | Ward et al. | |
| 2017/0020166 | A1 | 1/2017 | Keys et al. | |
| 2017/0042204 | A1 | 2/2017 | Tetrick et al. | |
| 2017/0127709 | A1 | 5/2017 | Quinde-Axtell et al. | |

FOREIGN PATENT DOCUMENTS

| CN | 102326795 | A * | 1/2012 |
| KR | 100384192 | B1 * | 5/2003 |

OTHER PUBLICATIONS

Translation of Li (CN 102326795) (Year: 2012).*
Translation of Ja et al. (KR 100384192). (Year: 2003).*
Australian Patent Office International-Type Search Report, issued in Australian Application No. 2017902096, dated Oct. 10, 2017.
International Search Report and Written Opinion, issued in International Application No. PCT/AU2018/050531, dated Jul. 23, 2018.
Fennema, Owen R. "Food Chemistry, Marcel Dekker." Inc, New York (1996). pp. 394-396.
Extended European Search Report, issued in European Application No. 18809004.7, dated Dec. 7, 2020.

* cited by examiner

*Primary Examiner* — Brent T O'Hern
(74) *Attorney, Agent, or Firm* — Parker Highlander PLLC

(57) ABSTRACT

Disclosed herein is a composition for producing egg-free simulated egg food products. The composition comprises whey protein, a soy material comprising a lipoxygenase inactivated soy flour and a pH modifying agent effective to alkalinise the composition upon hydration. A simulated egg food product having organoleptic properties similar to those of the egg food product if produced using hen eggs is produced upon hydrating and then cooking the composition.

17 Claims, No Drawings

EGG-FREE SIMULATED EGG FOOD PRODUCTS

This application is a national phase application under 35 U.S.C. § 371 of International Application No. PCT/AU2018/050531, filed May 31, 2018, which claims priority to Australian Application No. 2017902096, filed Jun. 1, 2017. The entire text of each of the above referenced disclosures is specifically incorporated herein by reference.

TECHNICAL FIELD

The present invention relates to compositions which, when hydrated and cooked, produce egg-free simulated egg food products. The present invention also relates to food products produced from such compositions.

BACKGROUND ART

Eggs are a valuable source of nutrients in the human diet and include high quality proteins, lipids, vitamins and minerals. Hen eggs also have special culinary functionality, including their emulsification, heat setting and stabilising effects in foods. However eggs are not always in a convenient form for consumers, due to their limited shelf-life, fragility and cost of production and distribution. Whole eggs are also relatively high in saturated fats and cholesterol, which many consumers need to limit in their diets for health reasons. Further, the possibility of eggs carrying avian-related diseases like bird flu or food-borne diseases from bacterial loads is an ever-present risk, necessitating additional processing steps such as pasteurisation and irradiation treatments, which can increase the cost of and adversely affect the functionality of the resultant egg product. Periodic outbreaks of bird flu affecting large commercial flocks requiring regional culling results in both ethical issues, expenses, operational disruptions and price fluctuations.

A growing number of consumers are therefore moving to less egg-based food protein sources for reasons of improved nutrition, reduced risk of avian-related diseases like bird flu, as well as for personal dietary preferences such as vegetarian and religious reasons.

A number of egg substitutes and egg extenders is available which attempt to mimic the organoleptic properties and culinary functionality of hen's eggs. However, many of these egg substitutes and extenders are not entirely egg-free, in that they require the presence of at least some egg white in order for the egg-substitute to be capable of achieving the rheological properties of an egg (and, in particular, its heat-setting functionality). Many existing egg substitutes having alternative protein sources have failed to achieve the rheological properties of eggs and are often detrimentally affected due to the inherent "off" flavours imparted by the non-egg ingredients. Further, many of these egg substitutes and extenders do not reproduce the nutritional properties of eggs, nor their physical properties such as their pH, appearance and texture. It has been an enduring challenge in the art to produce egg-substitutes that can fully replace hen eggs in consumers' diets, both in terms of their nutrition and their special functionality in cooking.

It would be advantageous to provide simulated egg food products that may be completely egg-free as well as compositions for producing such egg-free simulated egg food products.

SUMMARY OF THE INVENTION

In a first aspect, the present invention provides a composition for producing an egg-free simulated egg food product. The composition comprises whey protein, a soy material comprising a lipoxygenase inactivated soy flour and a pH modifying agent effective to alkalinise the composition upon hydration. A simulated egg food product having organoleptic properties similar to those of the egg food product if produced using hen eggs is produced upon hydrating and then cooking the composition.

The composition of the present invention provides a complete replacement for whole eggs, with its unique combination of ingredients imparting a culinary functionality and resultant organoleptic properties similar to those of hen's eggs when cooked alone or in recipes. The inventors' discovered that compositions of whey protein, soy materials and pH modifying agents in accordance with the present invention can, when hydrated and cooked, form an egg-free food product that closely simulates whole hen's eggs, both functionally and organoleptically. In effect, the simulated egg food products that can be produced in accordance with embodiments of the precent invention can have organoleptic properties similar to those of the same egg food product but which was produced using hen eggs in a conventional manner. The whey protein when in the composition mimics the organoleptic and culinary functionality and properties of egg whites. The soy material when in the composition provides nutritional and organoleptic properties similar to that of an egg yolk, coalesces with the whey protein at the appropriate pH and moderates the whey protein's setting, resulting in a softer set product than would have been expected to be the case. To the best of the inventors' knowledge, food products having such functionality and organoleptic properties have not previously been achievable in the complete absence of egg and, in particular, egg white.

As will be described in further detail below, the proportion of whey protein to soy material in the composition may, in some embodiments, be variable in order to impart the eating quality of whole egg, egg-white or egg-yolk to the hydrated and cooked composition. In effect, the proportions of whey protein and soy material in the composition can be modulated to contribute different degrees of textures of simulated egg white or simulated egg yolk in the cooked product. Thus, the composition of the present invention may advantageously be used for a wide variety of cooking applications, similar to those for hen's eggs.

In some embodiments, the whey protein may be whey protein isolate.

In some embodiments, the soy material may comprise a lipoxygenase-inactivated soy bean cotyledon flour. The soy material may, for example, be a processed soy material (PSM), such as that described in Australian patent no. 559031 (and in further detail below).

In some embodiments, the pH modifying agent may be selected from the group consisting of, for example, potassium bicarbonate, sodium bicarbonate, tri-potassium phosphate, di-sodium phosphate dihydrate and combinations thereof. In some embodiments, the pH modifying agent may be effective to alkalinise the hydrated composition to a pH of between about 7.2 and 8.5.

In some embodiments, the composition may further comprise an oil. Including an oil in the composition has been found by the inventors to provide advantages including improving the handleability and storage of the composition when in a dry powder form, imparting desirable organoleptic properties to the cooked product and imparting useful nutritional properties to the resultant food product. Oils may also be capable of dissolving hydrophobic components (e.g. vitamins, flavourants, etc.), which may help to improve their stability and improve the flavour profile of the simulated egg food product. In some embodiments, the oil may be a vegetable oil, such as sunflower oil, palm fruit oil, canola oil, soy oil, safflower oil, olive oil, rice bran oil, corn oil, coconut oil and combinations thereof. In some embodiments, the oil may be an animal oil. The use of animal oil or fish oil, for example, may introduce desirable omega 3 or DHA fatty acids to the resultant food product.

In some embodiments, the composition may further comprise a fat, for reasons similar to that described in the preceding paragraph. Such a fat may also contribute to the organoleptic quality of the resultant food product, noting that hen eggs have a natural fat content. The fat may, in some embodiments, be hydrogenated in order to improve its handleability.

In some embodiments, the composition may further comprise additional components, including an additional component selected from one or more of the following: salt (sodium chloride), sugar, an emulsifier, a flavourant, a colourant, an antioxidant, a stabiliser, a fibre (soluble or insoluble), a vitamin and a mineral.

In a second aspect, the present invention provides a composition for producing an egg-free simulated egg food product. The composition comprises between about 28% w/w and about 70% w/w whey protein, between about 15% w/w and about 50% w/w of a lipoxygenase-inactivated soy flour, between about 0.2% w/w and about 1.8% w/w of a pH modifying agent effective to alkalinise the composition upon hydration and, optionally, an oil.

Compositions in accordance with the second aspect of the present invention can, when hydrated and cooked, produce simulated egg food products having organoleptic properties similar to those of the egg food product if produced using hen eggs.

The composition of the first or second aspect of the present invention may, for example, be provided in powder form (e.g. as a dry-mix) as a dry powder for subsequent hydration by mixing with an aqueous liquid. In some embodiments, for example, about 25 g of the dry powder composition may be mixed with about 75 g of an aqueous liquid (e.g. water or milk) to produce a hydrated product in the form of a batter ready for cooking.

In a third aspect, the present invention provides a liquid composition for producing an egg-free simulated egg food product, the liquid composition comprising the composition of the first or second aspect of the present invention and a liquid. The liquid composition may subsequently be cooked to form the egg-free simulated egg food product, or may be used as is for producing uncooked egg-free simulated egg food products (e.g. a mayonnaise or beverages which traditionally contain uncooked hen's eggs).

In a fourth aspect, the present invention provides a cooked egg-free simulated egg food product produced by cooking a hydrated composition of the first or second aspect of the present invention or the liquid composition of the third aspect of the present invention. Such a cooked food product may, for example, have organoleptic properties similar to those of an omelette, scrambled eggs, poached eggs, steamed eggs, fried eggs or food products including cooked egg whites or cooked egg yolks.

The compositions of the first, second and third aspects of the present invention may also be used as egg extenders, where they are mixed with hen eggs when forming an egg-containing food product. Use of the compositions of the present invention in this manner may advantageously reduce the cost of the resultant egg-food product (i.e. that which is being extended), but also impart beneficial nutritional advantages, such as by reducing its total cholesterol content.

In a fifth aspect, the present invention provides a method for producing a cooked egg-free simulated egg food product. The method comprises the steps of:
mixing whey protein, a soy material comprising a lipoxygenase-inactivated soy flour, a pH modifying agent effective to alkalinise the composition upon hydration and, optionally an oil, to produce a dry mixture;
mixing the dry mixture with a liquid; and
cooking the mixture, whereby a cooked egg-free simulated egg food product is produced having organoleptic properties similar to those of the egg food product if produced using hen eggs.

In a sixth aspect, the present invention provides a method for producing a cooked egg-free simulated egg food product. The method comprises the steps of:
mixing between about 28% w/w and about 70% w/w whey protein, between about 15% w/w and about 50% w/w of a lipoxygenase-inactivated soy flour, between about 0.2% w/w and about 1.8% w/w of a pH modifying agent effective to alkalinise the composition upon hydration and, optionally, an oil to produce a dry mixture;
mixing the dry mixture with a liquid; and
cooking the mixture, whereby a cooked egg-free simulated egg food product is produced having organoleptic properties similar to those of the egg food product if produced using hen eggs.

The methods of the fifth and sixth aspects of the present invention may, for example, be used to produce a cooked food product having organoleptic properties similar to those of an omelette, scrambled eggs, poached eggs, steamed eggs, fried eggs or products including cooked egg whites or cooked egg yolks (or combinations thereof).

In a seventh aspect, the present invention provides a method for producing an uncooked egg-free simulated egg food product (e.g. a mayonnaise or beverages which traditionally contain uncooked hen's eggs). Such a method comprises the steps of:
mixing whey protein, a soy material comprising a lipoxygenase inactivated soy flour, a pH agent effective to alkalinise the composition upon hydration and, optionally, an oil,
to produce a dry mixture; and
mixing the dry mixture with a liquid.

In an eighth aspect, the present invention provides a method for producing an uncooked egg-free simulated egg food product. Such a method comprises the steps of:
mixing between about 28% w/w and about 70% w/w whey protein, between about 15% w/w and about 50% w/w of a lipoxygenase-inactivated soy flour, between about 0.2% w/w and about 1.8% w/w of a pH modifying agent effective to alkalinise the composition upon hydration and, optionally, an oil,
to produce a dry mixture; and
mixing the dry mixture with a liquid.

In some embodiments of the method of the fifth, sixth, seventh or eighth aspect of the present invention, the dry mixture may comprise the composition of the first or second aspect of the present invention.

Other aspects, embodiments and advantages of the present invention will be described below.

DESCRIPTION OF EMBODIMENTS

The present invention provides a composition for producing an egg-free simulated egg food product, the composition comprising:

whey protein;
a soy material comprising a lipoxygenase-inactivated soy flour; and
a pH modifying agent effective to alkalinise the composition upon hydration. A simulated egg food product having organoleptic properties similar to those of the egg food product if produced using hen eggs is produced upon hydrating and then cooking the composition.

The present invention also provides a composition for producing an egg-free simulated egg food product, the composition comprising:
between about 28 and about 70% w/w whey protein;
between about 15% w/w and about 50% w/w of a lipoxygenase inactivated soy flour;
between about 0.2% w/w and about 1.8% w/w of a pH modifying agent effective to alkalinise the composition upon hydration; and
optionally, an oil.

The compositions of the present invention can advantageously be used to produce cooked egg-free simulated egg food products that have organoleptic properties similar to those of the same food products, but which were produced using hen's eggs. Indeed, the inventors' have tasted no other egg-substitute having organoleptic properties as close to hen's eggs as those prepared according to the present invention and described in further detail below. Selection of specific whey protein preparations and soy material(s) can also result in simulated egg food products which have nutritional profiles similar to those prepared using eggs, but which contain no (or significantly reduced amounts of) cholesterol. Egg-free simulated egg food products which may be produced in accordance with the present invention include, for example, omelettes, scrambled eggs, poached eggs, steamed eggs or fried eggs. The compositions of the present invention can also be used in recipes for forming cooked food products such as cakes, custards (e.g. baked custard), tarts, cookies, soufflé, frittata, muffins, pancakes, crepes, spreads, bread, pudding, salads, soups, sauces, tarts, stuffings, sausages, fritters, pies, etc. The compositions of the present invention can also be used in recipes for forming uncooked food products such as mayonnaise or beverages which traditionally contain uncooked hen's eggs.

As used herein, the phrase "organoleptic properties similar to those of the egg food product produced if using hen eggs" or "organoleptic properties similar to that of cooked eggs" is to be understood to mean that the egg-free simulated food product to which the phrase refers has organoleptic properties (including taste, aroma, appearance, odour, texture and mouthfeel) that mimic those of the same type of food product, but which was prepared in the traditional manner using hen's eggs.

As used herein, the term "Egg" or "Hen's egg" refers to all edible poultry eggs, including chicken eggs, goose eggs, quail eggs and other known edible eggs from birds. "Egg white", as used herein, refers to the above-mentioned type of egg from which the yolk has been removed. Similarly, "Egg yolk", as used herein, refers to the above-mentioned type of egg from which the egg white has been removed.

The culinary functionality (heat setting, emulsifying, aeration etc.) of the hydrated compositions of the present invention can closely mimic those of whole hen's egg. Hen's eggs have many useful functional properties including emulsifying, aerating and especially, thermal setting characteristics, which account for the wide use of eggs in foods. The ability of hen egg whites to heat coagulate has enabled many food products to be developed and this is owing to the loss of liquidity of egg whites at about 60° C. to eventually form a firm gel by about 80° C. Hen egg yolks form different heat set properties to whites as they begin to lose fluidity at about 65° C. and coagulate to form a soft and short texture at about 85° C. The pH of egg yolks is about 6.4 while egg whites is about 7.0-9.0. Whole egg pH is about 7.1-7.9.

As used herein, the phrase "culinary functionality similar to that of hen's eggs" is to be understood to mean that the hydrated (and cooked, where relevant) composition to which the phrase refers has physical (e.g. rheological, emulsifying, aeration, heat setting, etc.) and chemical (e.g. pH, nutritional content) properties that mimic those of a hen's egg alone.

Furthermore, the proportion of whey protein to soy material in the compositions of the present invention may be varied in order to impart the organoleptic "eating quality" of egg-white or egg-yolk to the hydrated and heated compositions. As such, embodiments of the composition of the present invention can be used to simulate both fractions of hen's eggs (i.e. the whites and the yolks) separately, and hence are useable in many cooking applications in place of hen's eggs, whilst closely simulating the appearance, taste, texture, cooking methods and nutrition of the egg. Embodiments of the compositions of the present invention may also be combined in a manner that mimics unbroken yolks and white albumin co-cooked as is usual in fried, coddled and steamed whole hen egg recipes, again without requiring changes to traditional methods of cooking. Thus, for recipes that require the egg white and yolk function (such as in the cooking of an unbroken egg), a simulated cooked yellow yolk may be surrounded by a simulated white portion. The texture, flavour, colour and appearance of each portion of a fried, coddled, microwaved or steamed whole egg can be simulated by the combined compositions of the present invention. Alternatively, some embodiments of the compositions of the present invention might be used to simulate hen egg yolk emulsification functionality, as required in mayonnaise recipes.

The compositions of the present invention may be provided in any suitable form. Typically, as the compositions are likely to be stored for some time before use, the composition may be provided in dry powder form for mixing with a liquid. Such "dry-mixes" are common in the food industry and are well-known and acceptable to consumers. They are a shelf-stable, ready to use consumer product, where the consumer simply adds water (or another aqueous liquid such as milk, for example) and hand mixes the product (e.g. by whisking with a fork or a mechanical stick blender, as is commonly performed with hen's eggs) in order to produce an egg-like food product ready for use (e.g. cooking) in exactly the same manner as would be the case for real hen eggs in traditional recipes.

The dry preparations prepared using standard dry-mix operations would typically be admixed with water to provide an egg-like food product ready for use (e.g. cooking). However, other liquid food components such as skim milk or other types of milk, various stocks such as vegetable stock, meat stock or chicken stock and the like could be used in place of, or in addition to, water (noting that such alternative liquids may contain traces of cholesterol or may not be of neutral pH).

The composition may alternatively be provided in liquid form, for example as a concentrate or a batter, which may be more useful for commercial kitchens and the like, where the composition is unlikely to be stored for long periods of time. The stability of such liquid compositions may be further improved if the liquid concentrate or batter was chilled or frozen. In another aspect of the present invention, for example, a liquid egg replacement composition comprises the composition of the present invention, as described herein, and an aqueous liquid. Whilst such "wet-mixes" would likely have a shorter shelf-life than equivalent "dry-mixes", their shelf life could still be a useful period of time, and especially if preservatives or non-heating preservation methods (e.g. hyperbaric processing) were used, or if the wet mixes were stored chilled or frozen. In some embodiments, a shelf-stable pumpable or pourable liquid concentrate mix may be formed using a suitable measure of an oil. Such shelf-stable liquid compositions may be useful in industrial applications, for example.

The composition may alternatively be provided with its components in a mixture of powder and liquid forms. For example, the pH modifying agent may be provided in liquid form and packaged separately from the remainder of the dry components. In such embodiments, the liquid pH modifying agent may be added to the powders with the liquid (e.g. water) when hydrating the composition pre-cooking.

An example of a whole egg recipe that relies on the functional characteristics of fresh eggs alone is the French omelette. A French omelette is prepared by lightly whisking two fresh eggs in a bowl, pouring the whisked mixture into a pre-buttered low heated skillet and, as the egg begins to set, the omelette is carefully rolled several revolutions to form a fluffy yellow cylinder typically having no browning on the pan side and being moist and tender on the inside. This recipe can be used as a benchmark for the functional and organoleptic properties of compositions of the present invention and the resultant simulated egg food product, as this has been found by the inventors to be a difficult egg food product to mimic. Indeed, the inventors have found that none of the commercially-available egg substitutes of which they are aware are capable of producing a total simulated cooked French omelette comparable to that produced using hen eggs alone.

In another aspect of the present invention, provided is a cooked egg-free simulated egg food product produced by heating (i.e. cooking) a hydrated composition of the present invention or the liquid composition of the present invention. The cooked egg-free food product may, for example, have organoleptic properties similar to those of an omelette, scrambled eggs, poached eggs, steamed eggs, fried eggs or products including cooked egg whites or cooked egg yolks.

The compositions of the present invention can also be used in recipes for producing food products such as omelettes, fried, poached, steamed, fried or scrambled eggs, cakes, custards (e.g. baked custard), tarts, cookies, soufflé, frittata, muffins, pancakes, crepes, spreads, bread, pudding, salads, soups, sauces, tarts, stuffings, sausages, fritters, pies, etc.

The relative proportions and form of the whey protein, soy material and pH modifying agent in the compositions of the present invention can be varied in order to form hydrated compositions having a culinary functionality similar to that of hen's eggs and cooked food products having organoleptic properties similar to those produced with hen's eggs. Varying the components of the composition and/or their relative proportions in the composition will result in different food products, and simulated egg food products having organoleptic properties similar to those of many types of egg-containing food products can thus be formed. Guidance regarding the components for inclusion in the composition which are capable of forming certain kinds of egg-free simulated egg food products are provided below. Based on the teachings contained herein, it is within the ability of a person skilled in the art, using no more than routine experimentation, possibly with some trial and error, to ascertain whether a particular composition falls within the scope of the present invention.

The test for whether or not a composition including whey protein, soy material and a pH modifying agent falls within the scope of the first aspect of the present invention is, of course, the organoleptic properties (especially the taste and mouthfeel) of the resultant food product when compared with its egg-containing equivalent. The French omelette test described herein is, for example, one suitable benchmark for assessing a particular composition's organoleptic properties. If a composition including whey protein, soy material and pH modifying agent, when hydrated and cooked, forms an egg-free simulated French omelette having organoleptic properties similar to those of French omelettes produced using hen eggs, then that composition falls within the scope of the present invention. Cooking methods for other egg-containing food products are similarly well known.

Each of the components of the composition of the present invention will now be described.

Soy Material

The composition of the present invention includes a soy material comprising a lipoxygenase inactivated soy flour.

Soybeans, and soy materials derived therefrom, are high in protein, oils and other key ingredients, and are cholesterol-free (indeed, they have been shown to reduce cholesterol absorption). Full fat soy flour has protein and fat contents of about 42% and 21%, respectively, and can be obtained by dehulling soybeans and exposing the cotyledons to conditions whereby enzymes contained therein (particularly lipoxygenase) are inactivated so that they cannot deleteriously interact with other components of the composition (or other foods with which the composition is mixed). One such deleterious interaction, for example, results in painty and grassy off-flavour development, which is highly undesirable in food products. By heat-inactivating the lipoxygenase in the soy material, any other potentially deleterious enzymes would also be inactivated and the digestibility index increases.

It should also be noted that genetically modified soy beans that are lipoxygenase-negative are commercially available. Although not specifically trailed by the inventors in the compositions of the present invention, the inventors expect that such genetically modified soy beans provide the lipoxygenase inactivated soy flour for use in the present invention. Advantageously, such a soy beans may require less processing than their natural counterparts.

The treated (i.e. enzyme inactivated or enzyme negative) soy beans (e.g. soy bean cotyledons, as described below) are ground down to a particle size whereby the resultant flour does not impart any "grainy" texture or mouthfeel to the simulated egg food product (e.g. the resultant cooked product). Indeed, the resultant soy flour should ideally have a particle size whereby the simulated egg food product has an imperceptible floury texture.

In the present invention, the soy material comprises (or is) a lipoxygenase inactivated soy flour (i.e. an enzyme inactivated soy flour). In some embodiments, the soy material may comprise (or be) an enzyme (lipoxygenase) inactivated full-fat soy flour. Of the various available forms of soy material (some of which are described below), a high quality, full-fat soy flour is preferred for use in the present invention because it contains near native soy protein, which is primarily un-denatured and has a high dispersability index (which extracted proteins often lack), allowing faster hydration in use. Such soy material can have a low (or bland) soy flavour profile, a natural buttery, egg-like flavour, a high degree of functionality with respect to protein quality, protein solubility, emulsifying properties and antioxidant properties, a relatively high content of all the beneficial natural components of whole soy (cotyledons), a natural soy oil content, a relatively low cost and an egg-like colour. The inventors have found that alternative techniques for processing of the soy beans (i.e. to produce soy materials of the kind described below) may reduce the content of components other than soy protein and may reduce the protein's solubility and increase off-flavour development.

In some embodiments, the soy material may comprise an enzyme (i.e. lipoxygenase) inactivated whole soy bean cotyledon flour (e.g. a full-fat lipoxygenase inactivated whole soy bean cotyledon flour). For example, whole soy bean cotyledon flour preparations are available that are processed only to inactivate lipoxygenase and reduce trypsin inhibitor activity, and which retain a high degree of water solubility and dispersability. Ideally, the soy material used in the compositions of the present invention has not undergone the typical oil extraction process such as is done for soy protein isolates (described below), where the solubility, colour and flavour of the protein can be inferior. In the embodiments of the present invention described in further detail herein, whole soy bean cotyledon flour preparations have been found to impart a simulated egg yolk appearance, functionality (for example emulsification and high antioxidant activity), colour, texture, bland flavour, as well as some desirable nutritional components and taste characteristics.

In some embodiments, the soy material is a processed soy material (PSM). Full fat soy flours which have been processed in a controlled manner, as exemplified by the processes and products disclosed in Australian patent no. 559031 (incorporated herein by reference), have an advantageous bland flavour, high stability, easy wetting, dispersion and outstanding emulsifying properties. The PSM disclosed in AU559031 lacks any significant heat-setting properties, but does importantly coagulate upon heating, imparting a mouthfeel similar to that of egg yolk to the resultant cooked food product. Indeed, the PSM disclosed in AU559031 has been found to be useful as an egg-yolk substitute by the present inventors, with this discovery being the subject of Australian patent application no. 2005216574, the disclosure of which is also incorporated herein by reference. Specifically, PSM (and similar soy preparations described in AU2005216574) have previously been found to approximate the eating quality of egg yolk, be economical, and have a natural low saturated fat content of about 21%. Also, PSM has a relatively high nutritional profile, especially with respect to its essential amino acid profile. Further, PSM also has a useful carbohydrate content, contains some fibre, is easily assimilated in digestion, but has a low glycaemic index, all of which are useful attributes of healthy foods. PSM is also high in lecithin and vitamin E and other micronutrients making it a desirable food ingredient. The active antioxidants in PSM may also impart stability to foods with which they are mixed (e.g. by stabilising lipids, fatty acids and flavours contained therein), thereby resulting in improved shelf life. PSM is also very bland tasting and is light cream yellow in colour, making it easy to incorporate into egg style recipes (including egg white simulations, as described below).

Soy material (including soy protein) in PSM has also not been exposed to chemical extraction methods used in manufacturing soy protein isolate or defatted soy flours. The gentle and controlled steaming method used to produce PSM and described in AU559031 inactivates the lipoxygenase of soy beans (which might otherwise result in painty and grassy off-flavour development), whilst retaining a great degree of protein solubility. The flour produced from the so-processed soy beans can be refined to specific (very fine) particle sizes to enable substantially instant hydration when mixed with an aqueous liquid, and imparts no grainy mouthfeel to the resultant simulated egg food product. Also the PSM flour is a mix of natural protein, oils, emulsifiers, antioxidants, fibres and carbohydrates, which can contribute to the egg-like food product quality with respect to texture, flavour, setting characteristics and nutrition, not possible with soy extracts.

Minor amounts of other bland soy materials may also be used in the composition, if such materials would impart beneficial properties to the composition or resultant simulated egg food product (e.g. to increase its soy protein content), but not deleteriously affect its performance (e.g. by adversely affecting the functionality of the composition comprising the lipoxygenase inactivated soy flour or affecting its organoleptic properties). For example, other forms of soy material which may be used in addition to the lipoxygenase inactivated soy flour may include soy protein isolate (about 90% protein), soy concentrate (about 70% protein), defatted or partially defatted soy flour (having a protein content of about 50% and its natural oils removed), and refatted soy flour or concentrate. Routine experimentation, possibly with some trial and error, would enable a person skilled in the art to ascertain the contribution any such additional soy material(s) make to the organoleptic properties of the simulated egg food product produced from the composition, and hence whether the composition falls within the scope of the present invention.

PSM flour has a protein content of about 40-43% and a natural oil content of about 20-22%. The other soy materials described above and derived from by-products of the oil extraction process can have protein contents ranging from about 50% to about 90%, and may be used in the present invention as described above (i.e. as adjunct ingredients to the lipoxygenase inactivated soy flour). In some embodiments, the blend of selected soy material and whey protein can result in any chosen protein content and can, if required, approximate the protein content of whole egg (about 55%) on a dry weight basis.

The soy material is present in the composition in an amount such that a simulated egg food product having organoleptic properties similar to those of the same food product that has been formed using hen's eggs is formed upon hydrating and then cooking the composition. The soy material adds a controlled tender softness to the setting whey protein and provides a textural mouthfeel, appearance and taste similar to that of an egg yolk. The inventors have found that too much soy material (which necessitates a concomitant reduced amount of whey protein) can result in loss of setting properties (especially for omelettes), with the resultant food products having liquid centres and fragile curds. Similarly, the inventors have found that not enough soy material can result in overly rubbery omelettes lacking desirable egg-like tender creamy textures. The soy material also aids in stabilising the food product by reducing syneresis in the hydrated and cooked composition, possibly due to the fibre and polysaccharide content of the composition and due to the lecithin in the whole soy flour.

The actual amount of soy material in the composition will depend on factors such as the nature of the egg food product the composition is intended to form, the type of soy material, the amount and type of whey protein and the presence of any other components in the composition and/or food product. The pH of the hydrated composition and the cooked food product will also affect the amount of soy material (and whey protein) required. Routine experiments using the teachings contained herein for guidance and trailing different quantities of soy material(s) in the composition and evaluating the resultant simulated egg food product will enable a person skilled in the art to produce a composition containing an appropriate amount of soy material.

As well as the functional attributes imparted to the resultant food product, the soy material is also an economical ingredient which can reduce the overall cost of producing the composition.

Generally speaking, the inventors believe that the composition should include between about 15% w/w and about 50% w/w of the lipoxygenase inactivated full-fat soy flour. In some embodiments, for example, the composition may include between about 18% w/w and about 50% w/w, between about 20% w/w and about 40% w/w, between about 25% w/w and about 45% w/w, between about 30% w/w and about 40% w/w or between about 35% w/w and about 40% w/w of the lipoxygenase inactivated soy flour. In some embodiments, for example, the composition may include about 15% w/w, about 18% w/w, about 20% w/w, about 25% w/w, about 30% w/w, about 35% w/w, about 40% w/w, about 45% w/w or about 50% w/w of the lipoxygenase inactivated soy flour. It is to be noted that the % w/w values referred to herein relate to that of the dry composition.

If soy isolate or soy concentrate is used in addition to the lipoxygenase inactivated soy flour (e.g. PSM or other soy flours), it will be present in a sufficient amount so as to impart the required quantity of soy protein into the final food.

Whey Protein

The composition of the present invention also includes whey protein.

As noted above, hen's eggs have unique emulsifying, aerating and thermal setting characteristics. Egg whites heat coagulate (i.e. set) at about 60° C. and form a firm gel at about 80° C. Most egg products such as omelettes and scrambled eggs require soft curdy gels to form their characteristic organoleptic properties. Soft whey protein gels are, however, typically unstable and exhibit syneresis, whilst firm whey gels are typically undesirably translucent and gelatine-like and are often much firmer, drier and crumbly tasting than is the case for cooked eggs. The inventors have surprisingly and unexpectedly discovered that preparations containing whey protein, along with the other essential components of the compositions of the present invention, set with remarkably similar organoleptic properties to those of soft curdy white set egg white when heated. This heat setting quality of whey protein, when in the unique composition of the present invention, also imparts a culinary functionality to the composition which is remarkably similar to that of hen's eggs. Furthermore, the nutritional profile and relatively bland taste of whey protein reasonably closely matches that of egg whites. Indeed, simulated egg food products produced using compositions in accordance with the present invention have organoleptic properties closer to those of hen's eggs than is the case for any other egg substitute food products the inventors have ever experienced.

Whey protein may be provided in a number of forms, the most common of which are whey protein isolate (which contains 90% or more protein by weight and is processed to substantially remove fat, lactose and salts without denaturing the protein to any significant degree), whey protein concentrate (which contains between about 29%-89% protein by weight as well as fat, cholesterol and lactose), hydrolysate (whey proteins that are processed for easier metabolizing) and native whey (which is extracted from skim milk and not a by-product of cheese production).

As will be appreciated, whey proteins comprise a mixture of different proteins, depending on the source of the whey protein and the manner in which it has been processed. For example, whey is typically a mixture of beta-lactoglobulin (ca. 65%), alpha-lactoglobulin (ca. 25%), bovine serum albumin (ca. 8%) and immunoglobulins.

Any of these forms of whey protein may be used in the present invention, although whey protein isolate (WPI), preferably containing un-denatured and soluble whey protein, is generally preferred because of its relatively high protein content (which assists with gelling), lower fat content, reduced salt content and substantial absence of cholesterol and lactose (a sugar). Such a whey protein may, for example, be produced by membrane separation processing or by ion-exchange methods, and is readily commercially available. WPI also has a bland flavour, is white to cream in colour and typically processed from sweet dairy whey which is instantized (for example by spray drying) and readily available from dairy powder processors.

In some embodiments, however, it may be advantageous to use other forms of whey protein, or to combine different forms of whey protein (e.g. with the whey protein isolate), if that combination imparts advantageous functionality or properties (e.g. if it imparts a different nutritional profile to the composition or cooked simulated egg food product). Use of non-detrimental amounts of whey proteins other than isolate may also reduce the overall cost of the composition. For example, dry powder combinations containing whey protein comprising whey protein isolate (90% protein) and whey protein concentrate (35% or 80% protein) in the following proportions:

(1) WPI (90%):WPC (80%) of 1:1.7;
(2) WPI (90%):WPC (35%) of 1:0.42; and
(3) WPI (90%):WPC (80%):WPC (35%) of 1:0.21:0.21, have been found to result in reasonably well textured and formed simulated omelettes. In such omelettes the presence of whey protein concentrates tended to impart a sweeter taste, although this property may be advantageous in certain situations (e.g. where a sweeter taste is desired, such as may be the case for pancakes, for example). It should be noted that such food products containing WPC will also contain lactose, which some consumers may not be able to tolerate.

Routine experiments using the teachings contained herein for guidance, possibly with some trial and error, using different forms (and amounts) of whey protein preparations in the composition and evaluating the resultant simulated egg food product will enable a person skilled in the art to prepare a composition that contains an appropriate whey protein or combination of whey proteins for a desired food product.

Whey protein is present in the composition in an amount such that cooking (i.e. heating) the hydrated composition produces a simulated egg food product having organoleptic properties similar to those which the food product would have if prepared using hen's eggs. The resultant cooked composition therefore closely simulates the properties that would be imparted to the food product by cooked eggs. In effect, the whey protein sets when it is hydrated and then cooked, with the soy material coalescing with the whey protein during setting, thereby resulting in the unique simulated egg food product disclosed herein. As used herein, the term "set" is to be understood to mean the irreversible transition of increasing firming textures which occurs when the hydrated composition is heated to a temperature that causes the proteins to unravel and denature to form gels or matrices of increasing viscosity. This effect is physically demonstrated as an increased compression resistance (e.g. a tender firmness to bite) and reduced liquid fraction so no fluids separate from the ultimate semi-solid to solid cooked product. The desired set texture and appearance in culinary egg foods like omelettes, for example, is a soft opaque white albumen curd or softer opaque yellow yolk curd or the combination of these, which is easily cut with a fork and which shows no syneresis. The set gels should not be overly brittle, nor too rubbery or be mouth-drying. Nor should they be transparent, liquid or too fragile.

The inventors have found that too much whey protein can result in overly firm omelettes (for example), which can be undesirably brittle and rubbery. Similarly, the inventors have found that not enough whey protein can result in overly soft, curdy and under-set omelettes. The actual amount of whey protein in the composition will depend on factors such as the nature of the simulated food product the composition is intended to form, the amount of soy material in the composition and the presence of any other components. Again, routine experiments using the teachings contained herein for guidance and different quantities of the whey protein(s) in the composition, followed by an evaluation of the resultant food product will enable a person skilled in the art to produce a composition containing an appropriate amount of whey protein for producing an egg-free food product having the desired organoleptic properties.

Generally speaking, however, the inventors believe that the composition (i.e. pre-hydration) should include between about 28% w/w and about 70% w/w whey protein. In some embodiments, for example, the composition may include between about 30% w/w and about 60% w/w, between about 35% w/w and about 55% w/w, between about 40% w/w and about 50% w/w or between about 35% w/w and about 45% w/w of the whey protein. In some embodiments, for example, the composition may include about 30% w/w, about 35% w/w, about 40% w/w, about 45% w/w, about 50% w/w, about 55% w/w, about 60% w/w, about 65% w/w or about 70% w/w of the whey protein.

It should be noted that these proportions are for the composition itself (e.g. the "dry-mix"). Before cooking, the composition is hydrated with an appropriate volume of an aqueous liquid. In some embodiments, for example (such as those described in further detail below), about 25 g of the composition may be mixed into about 75 g of water, resulting in the % w/w of the components being quartered in the hydrated composition.

It should also be noted that the quantities described above relate to the total protein content in the composition, which may not be the same as the amount of the whey protein containing substance in the composition (e.g. WPI and WPC are not 100% whey protein).

Compositions including whey protein slightly outside of the ranges set out above may still have utility in the present invention. For example, a composition having 25% WPI and some gums to compensate for the relatively low amount of whey protein may also provide satisfactory simulated egg food products. Again, it is within the ability of persons skilled in the art to determine if such compositions fall within the scope of the present invention, using no more than routine trial and error.

pH Modifying Agent

The composition of the present invention also includes a pH modifying agent that is effective to alkalinise the composition upon hydration. As noted above, the pH of fresh egg yolk is about 6.4, the pH of egg white about 7.0-9.0 and whole egg has a pH of about 7.1-7.9 (which can increase to as much as about 8.5 during prolonged storage). Advantageously, the composition (i.e. when in liquid form) mimics this pH, whereby it can help to contribute to the composition's organoleptic properties and expected functionality when used in applications for traditional and existing egg-based recipes.

Furthermore, the heat setting functionality of whey protein may be affected by pH, and especially so under acidic conditions. It is therefore important to ensure that the pH of the composition is alkalised such that the whey protein will set upon heating, irrespective of any other components in the composition or other food ingredients which may be added during cooking.

In some embodiments (e.g. for whole egg-like compositions), the pH modifying agent may be effective to alkalinise the hydrated composition to a pH of between about 7.2 and 8.5, which is similar to hen eggs.

It should be noted that after the alkaline heat setting is substantially complete, the product may be acidified to achieve a desired flavour and/or improve the food product's storage stability. Thus, the pH modifying agent may be effective to alkalinise the composition upon hydration only or upon hydration and whilst cooking, depending on the intended simulated food product.

Any edible pH modifying agent may be used in the present invention, provided that it alkalinises the composition upon hydration and does not detrimentally affect the setting of the composition (in particular the whey protein) or its resultant organoleptic properties. The pH modifying agent may function to maintain the pH of the composition at a desired (alkaline) pH, or may function to increase the pH of the composition to the desired (alkaline) pH.

It is within the ability of a person skilled in the art, using the teachings contained herein and no more than routine experimentation, to determine whether a particular pH modifying agent will be suitable for use in the composition of the present invention. If a pH modifying compound does not alkalinise the hydrated composition such that a simulated egg food product having organoleptic properties similar to those of cooked egg is formed by hydrating and then cooking the composition, then it falls outside the scope of the present invention. Other factors to consider in selecting a pH modifying agent also include the solubility of the alkalising agent, as well as its degree of fineness and hygroscopic nature. Examples of suitable pH modifying agents include acids (in the unlikely event of the hydrated composition having too high a pH) and bases normally found in food products. The pH modifying agent may, for example, be sodium or potassium phosphate, sodium or potassium carbonate, sodium or potassium bicarbonate, calcium bicarbonate, sodium acid pyrophosphate, acid calcium phosphate, potassium hydrogen tartrate, and the like. Specific pH modifying agents trailed by the inventors include potassium bicarbonate ($KHCO_3$), sodium bicarbonate ($NaHCO_3$), tri-potassium phosphate (TKP) and di-sodium phosphate dihydride (DSP). Alkali phosphates may also aid in protein solubilisation and emulsification of oil and water combinations, and their inclusion in the composition may thus impart additional benefits.

In some embodiments, combinations of such pH modifying agents might also be used, if this were to impart advantageous properties to the composition or cooked product. For example, a pH modifying agent combination found to be useful by the inventors includes a combination of sodium bicarbonate and tri-potassium phosphate. Another pH modifying agent combination found to be useful by the inventors includes a combination of sodium bicarbonate, tri-potassium phosphate and di-sodium phosphate dihydride. It may be preferred, in some embodiments, to use a low sodium combination of pH modifying agents because excess sodium can affect setting and may not be as nutritionally acceptable.

By way of example, in a series of trial experiments conducted by the inventors in which an egg replacement composition comprising 8.4% w/w whole soy flour (PSM), 12.5% w/w WPI, 3.8% w/w oil and 75% w/w water was cooked in the manner described above to produce a French omelette, the pH modifying agent deemed most appropriate (i.e. which resulted in food products tasting very similar to omelettes produced from hen's eggs) was a combination of $NaHCO_3$ (0.25%) with TKP (0.075%). The pH modifying agent adjusted the hydrated composition to a pH of 7.2-8.0. Omission of these pH modifying agents in the composition resulted in an acid pH of about 6.3-6.6 and the cooked egg-free omelette did not set.

The amount of the pH modifying agent(s) in the composition is an amount effective to alkalinise the hydrated composition to a pH at which heating/cooking produces a simulated egg food product having organoleptic properties similar to those of the same food product but produced using hen's eggs. Routine trial and experimentation can be used with the teachings contained herein for guidance, in order to ascertain the appropriate amount of a particular pH modifying agent for any given formulation. In general, however, the composition (i.e. the dry mix) may include between about 0.2% w/w and about 1.8% w/w of the pH modifying agent(s). In some embodiments, for example, the composition may include between about 0.8% w/w and about 1.2% w/w, or between about 1.0% w/w and about 1.2% w/w of the pH modifying agent(s). In some embodiments, for example, the composition may include about 0.2% w/w, about 0.5% w/w, about 0.8% w/w, about 1.0% w/w, about 1.2% w/w, about 1.5% w/w or about 1.8% w/w of the pH modifying agent(s). Again, it is to be noted that these values relate to the % w/w in a dry composition. As described above, the pH modifying agent may, in some embodiments, be provided in liquid form and packaged separately from the dry ingredients of the composition. In such embodiments, the % w/w may need to be adjusted accordingly.

Oil

The composition of the present invention also optionally includes an oil, which provides a nutritional value to the composition, as well as potentially contributing favourably to the organoleptic properties of the ultimate egg-like food product. Compositions including an oil may, for example, have a mouthfeel, texture and flavour similar to those of hen's eggs. The oil may also add lubricity and a tenderising function. Furthermore, the inventors have found that inclusion of an oil in a "dry-mix" composition can help to enhance its handleability. Oil can also give beneficial advantages in manufacturing of the dry powder composition, for example reducing dusting, aiding the incorporation of other oil-soluble ingredients like vitamins, colours and flavours. Some of the added oil may also impart natural oil soluble colours (e.g. vitamin pigments) to the food product, which are also very nutritious.

In some embodiments, the composition may further comprise a fat, for reasons similar to that described earlier. The use of animal oil or fish oil, for example, may introduce desirable omega 3 or docosahexaenoic acid (DHA) fatty acids to the food product. The fat may, in some embodiments, be hydrogenated in order to improve its handleability. The fat may, in some embodiments, be used alone (e.g. as a replacement for the oil) or in combination with an oil.

The fat content of hen's egg yolks (26.5%) contributes most of the fat content (10.1-12%) of the whole egg. The polyunsaturated/monounsaturated/saturated ratio of this fat is 0.34/1.4/1 or 12.4% polyunsaturated, 51.1% monounsaturated and 36.5% saturated fats. The cholesterol content of eggs is about 375 mg/100 g. It would be beneficial for healthy diets if the total lipids, saturated fat content and the cholesterol content could be minimised in the present invention.

An oil can be added to the composition as required to achieve a level of fat equal to, greater than or less than that of hen eggs, depending on the simulated food product's nutritional requirements, consumer preferences or the functional requirements in various recipes. Use of higher quantities of oil may also result in formulations in the form of a slurry, allowing it to be pumped during processing. Upon dilution with water before cooking, the fat content will be similar to eggs. The added oils are ideally of plant origin and may include, for example, oils from sunflower seeds, safflower, canola, rapeseed, rice bran, palm fruit, sesame seeds and cotton seed. Corn oil, peanut oil, olive oil, rice bran oil or soybean oil may also be used. Other derived food oils may be used like hydrogenated oils and fats. A mix of oils may also be added, having different levels of fatty acid saturation. The vegetable oil may be fully hydrogenated or partially hydrogenated. Alternatively, the vegetable oil may be a mixture of one or more vegetable oils or fully hydrogenated or partially hydrogenated vegetable oil.

The oil can be added to the dry ingredients in order for the dry premix to also include other fat soluble ingredients such as, for example, emulsifiers, antioxidants, vitamins (xanthophylls like lutein and zeaxanthin, tocopherols, folic acid, vitamin A, B D, E, K), flavours and colours, which are typically associated with chicken eggs. The added oil may also help to prolong the shelf life of the vitamins (etc.) in the composition.

The level of added oil in the dry premix can be from zero to about 45%, although some of this fat content may be derived from the soy material or from other ingredients in the composition. The oil (preferably a vegetable oil) may be present in the range of about 0 to about 30% w/w %, and more preferably from about 10 to about 20% w/w of the (dry) composition. In embodiments where the composition is in the form of a paste or a pumpable composition, the oil may be present in the range of about 30-45% w/w.

Fat contents of composition in accordance with embodiments of the present invention when hydrated may average 6.78% total fat, of which 4.02% is polyunsaturated, 1.54% is monounsaturated and 0.91% is saturated fat. The cholesterol content was about 0-0.17 mg/100 g. As noted above, at least some of the fat content of the egg-like food product of the present invention is derived from the added whole soy flour (e.g. PSM) which is a very healthy plant fat and, in the embodiments described above, contributes about 1.75% fat to the final product.

Specific embodiments of compositions for producing a food product in the form of a French omelette will now be described. The results of these experiments are set out in Table 1 (below) and described hereunder.

The properties of food products cooked using the French omelette technique with fresh eggs (Experiment i), commercially available egg powder (Experiment ii), hydrated compositions in accordance with specific compositions of the present invention (Experiments iii to viii, x and xi) as well as a composition falling outside the scope of the invention (Experiment ix) are described below in Table 1.

In these experiments, the whey proteins listed in the table were mixed with oil (16% w/w, dry composition), a pH modifying agent including sodium bicarbonate (1% w/w, dry composition) and tri-potassium phosphate (0.3%, dry composition) and whole soy flour (PSM, as described above) in an amount to make a total of 100% w/w of the dry composition. 25 g of this powder mixture composition was then placed into a small bowl and 75 g water was added, after which the mixture was whisked for 1 minute with a fork. The whisked mixture was poured into a preheated oiled 24 cm skillet, was spread over the base and, when beginning to set, was rolled into the omelette (as described above).

The cooking quality and sensory evaluation for organoleptic qualities of the resultant food products were then assessed and rated by a panel for 1. Degree of setting and ease of rolling the mixture during cooking, 2. Ability to hold rolled shape, 3. Degree of puffing (volume), 4. Degree of syneresis during and after cooking, 5. Colour, 6. Flavour, 7. Texture, 8. Aroma and 9. Ease of swallowing the cooked product. The panellists used a nine point Hedonic scale (Carpenter, R. P., Lyon, D. H and Hasdell, T. A. 2000. Guidelines for Sensory Analysis in Food Product Development and Quality Control. Aspen Publisher. 2ed. 210p. Gaithersburg, Md.).

In Experiment iii, the total whey protein concentration in the omelette was 7.5% w/w (8.4% w/w WPI, the WPI having a whey protein content of 90%) and this formed a very good omelette product. Increasing this level to 10% w/w in Experiment iv (11.25% w/w×90% protein content in the WPI) improved moistness and stability of the omelette. When WPI (90%) was replaced with WPC (80%) at the same whey protein concentration giving 15.9% whey protein total (Experiment vi), and the PSM reduced by the same weight, a good omelette could be formed, albeit drier than in Experiment iv (which was moister and had excellent textural properties similar to real egg) and was more fragile with an off metallic taste. At higher whey protein levels from WPI (e.g. 11.6% w/w, Experiment v) a firmer texture can be achieved, which may be beneficial if there is a consumer preference for this.

In Experiments vii and viii, the total whey protein level was only 7.31% w/w and 6.75% w/w, respectively, and both compositions had inferior setting characteristics. The inventors note a negative effect when whey protein concentrates are present, possibly due to the relatively high levels of residual salts, lactose and denatured protein in such preparations. Even when the total whey protein concentration was increased to 15.6% w/w, as in Experiment vi using WPC,

TABLE 1

| Expt. No. | Protein source (% = protein content of the whey protein) | Concentration of protein source (% w/w, in the cooked product) | Cooking and sensory score | Comments |
|---|---|---|---|---|
| i | Hen eggs | 100 | 10 | Firm springy texture on outside and softer in centre. |
| ii | Egg white powder (prior art) | 8.4 | 9 | Firm springy texture on outside and softer in centre with some syneresis. |
| iii | WPI (90%) | 8.4 | 9 | Firm springy texture on outside and softer in centre. |
| iv | WPI (90%) | 11.25 | 10 | Firm springy texture on outside and softer in centre. |
| v | WPI (90%) | 12.5 | 8 | Slightly overly firm texture but forms a set omelette. |
| vi | WPI (90%), WPC (80%) | 7.10, 11.84 | 8 | Firm to soft texture outside and inside. Less moist tasting omelette with slight metallic taste. Showed more browning. |
| vii | WPI (90%), WPC (35%) | 5.9, 2.5 | 7 | Soft texture, slow to firm, fragile. |
| viii | WPI (90%), WPC (35%), WPC (80%) | 5.9, 1.25, 1.25 | 6 | Hard to roll, softer texture, wet and pulpy unset centre. |
| ix | WPI (90%) | 2.5 | 2 | Does not set completely, fragile curdy centres. |
| x | WPI (90%) | 15 | 5 | Firm and chewy, rubbery, more brittle and not tender and moist. |
| xi | WPI(90%) | 7.2 | 8 | Softer springy texture on outside and softer and moist in centre. |

Criteria:
10 - resembles hen egg omelette;
5 - softer than hen egg omelette;
1 - unlike hen egg omelette As can be seen from the results set out in Table 1, in the embodiments of the compositions/food products described, the ideal amount of whey protein (preferably WPI in this case) is from about 7.53% w/w to about 11.25% w/w (the omelettes of Experiment nos. iii, iv and v having cooking scores close to that of the omelette produced from hen's eggs). The optimal level of total protein from PSM and WPI which gives the closest simulation of whole egg cooked in the form of an omelette is about 12.55-14.6% w/w, with optimal level at about 14.0% w/w.

there was still an antagonistic effect from the WPC, due to it diluting out the PSM content (1.74% w/w) compared with that of Experiment iv (9.43%).

The minimal amount of whey protein to give a setting function (but slightly inferior organoleptic properties) in the exemplified simulated omelette is about 6.48% (Example xi). The maximum amount of whey protein to give a satisfactory texture in the omelette is about 13.5% (Example x). Too much whey protein resulted in an overly tough texture while too low a level or too much whey protein concentrate resulted in inadequate setting.

The minimum amount of soy material (from PSM) in the simulated egg food products of Table 1 was found to be about 5.5% w/w and the maximum amount of soy material content from PSM was about 12.5% w/w. In these compositions, if too little PSM is present, the effects of greater amounts of whey protein cause an overly firm and chewy texture and lack of moist taste, no soft curds and the product tends to show syneresis. Conversely, too much PSM dilutes the setting effects of the whey protein isolate, resulting in a loss of setting with more liquid omelette centres and a fragile curd. Based on the experiments described above, the optimal amount of soy material content from PSM in the simulated omelette egg food product was about 9.13% w/w when the WPI protein content was 11.25% w/w.

As would be appreciated, an amount of whey protein, at least in the context of the compositions recited in Table 1 (i.e. containing the other recited components), which does not result in a simulated egg food product having organoleptic properties similar to those of Experiment i (i.e. a French omelette cooked using only hens eggs) is not an amount of whey protein falling within the scope of the present invention. Similarly, an amount of soy material which does not result in a simulated egg food product having organoleptic properties similar to the French omelette of Example i is not an amount of soy material falling within the scope of the present invention.

It can also be seen from Table 1 that the presence of whey protein concentrates (WPC), even at low levels, in these compositions can detract from the setting functionality of the whey protein. The inventors' speculate that this may be due to an increased salt content (salts are often present in whey protein concentrates), possibly in addition to relatively smaller amounts of non-denatured whey protein (due to the method by which whey protein concentrates are formed). Use of such forms of whey protein (e.g. to increase the protein content of the composition) therefore needs to be carefully assessed.

Based on the experiments described above, the inventors have determined minimum, maximum and preferred amounts and proportions of the WPI and PSM in an embodiment of a composition for forming a French omelette. The results of these experiments are summarised below in Table 2. It should be noted that the proportions of these components are set out in the liquid form of the composition described above (i.e. in which 25 g of the dry composition was mixed with 75 g water to form the liquid composition). The proportions of these components in the original dry composition can thus be obtained by multiplying by 4.

TABLE 2

Composition Ranges of Cooked Omelette

| Ingredient | Preferred % w/w in WPI-PSM blend | Minimum % w/w WPI-PSM blend | Maximum % w/w WPI-PSM blend |
| --- | --- | --- | --- |
| Whey protein isolate (90% protein) | 11.3% | 8.3% | 12.5% |
| PSM Flour (40% protein) | 9.1% | 12.5% | 8.08% |
| Ratio PSM:WPI | 1:1.24 | 1:0.66 | 1:1.55 |

The methodology described above to obtain an egg-like food product (a French omelette, in this particular case) using the compositions set out above is also generally applicable to other compositions falling within the scope of the present invention, and is generally applicable for ascertaining whether or not a specific form and amount of a whey protein and a specific form and amount of a soy material falls within the scope of the present invention. For applications in egg-like food products other than French omelettes, either to simulate whole egg foods or provide egg-substitutes for use in other recipes, the ratio and type of whey protein and soy material can be modulated in order to produce/form the ultimate product. In some cases, compositions having the extreme ratios of the components can be useful. For example, for simulated egg whites, the maximum amount of whey protein may be used and for simulated egg yolks the maximum amount of soy material (e.g. PSM) may be used.

The inventors also surprisingly found that the amount of the PSM in compositions similar to those shown in Table 1 could be modulated in the dry mix composition with the amount of WPI in order to allow the formation of simulated cooked hen egg whites (when the amount of PSM was relatively low compared to the amount of whey protein) and the formation of simulated cooked egg yolks at the other end of the scale (i.e. when the amount of whey protein was relatively low compared to the amount of PSM). For example, a simulated tender cooked egg white may be produced using a ratio of about 1 part PSM to 3.7 parts WPI in the hydrated composition. A simulated cooked tender egg yolk may be produced with a ratio of about 1 part PSM to 1.1 parts WPI in the hydrated composition.

The inventors also found that using soy materials in the form of soy protein isolate does not give these results, presumably due to the damage which occurs to the soy protein during its processing. Indeed, use of soy protein isolate instead of PSM in experiments similar to those described above was found to result in dark brown coloured products and splitting as it cooks leading to syneresis, difficulty in forming a good volume omelette and the production of off beany flavours.

Other Potential Ingredients

The composition of the present invention may also optionally include additional ingredients, where such ingredients are not detrimental to the functional and organoleptic properties described herein and would help to improve the composition and resultant simulated egg food product. Examples of such additional ingredients will be described below.

The composition may also include a salt such as sodium chloride or potassium chloride, which has been reported to induce gelation in whey proteins due to increased ionic strength effects. Sodium chloride may also be used to enhance the taste of the food product, salt being commonly applied to egg-containing foods. If present, the sodium chloride should amount to no more than about 0.5% w/w in the (dry) composition. The inventors have found that excess sodium chloride levels (e.g. >1% of the dry composition) can interfere with the texture of the cooked product, causing graininess, a spongey texture and uneven setting of simulated omelette food products. It may therefore be better to add additional sodium chloride for taste after cooking.

The composition may also include a sugar, which sweetens the composition and resultant food product, but which may also help in imparting a cooked colour to the food product (as is desirable for American style omelettes and fried eggs, for example), due to the sugar caramelising where in contact with the heated surface (although this might already be achievable when the composition includes whey powders which are high in lactose). Sweeteners may also be present. The sweetener may be a food grade carbohydrate, such as corn syrup solids, corn syrup, lactose, dextrins, sucrose, dextrose, fructose, starch, modified starch, fructose, maltodextrine, polydextrose, polyhydric alcohols, combinations thereof and the like. If present, the sugar or sweetener is present in the composition in an amount effective to sweeten the resultant food product, for example, in an amounts ranging from about 0.5 to about 15% by weight of the composition and more preferably from about 1% to about 9% by weight.

In another embodiment, the sweetener may be a non-nutritive sweetener, such as sucralose, aspartame, acesulfame (e.g., acesulfame-K), neohesperidin dihydrochalcone, stevia sweeteners, thaumatin, glycyrrhizin, maltitol, lactitol, isomalt, fructooligosaccharide sweetener, and the like. If present, the non-nutritive sweetener is present in the composition in amounts as low as 0.001% by weight, although amounts of between about 0.05% and about 2.5% by weight may be more useful, depending on the intensity of the non-nutritive sweetener.

The composition may also include an emulsifier in order to help homogenise the ingredients of the composition and more evenly disperse them. Commercially available emulsifiers include lecithin, lysolecithin, phosphatidyl-choline rich fractions of lecithin, polysorbates, mono and diglyceride, diacetyl-tartaric acid esters of mono and diglycerides, monosodium phosphate derivative of mono and diglycerides, polyoxyethylene sorbitan fatty acid esters, sucrose fatty acid esters, esters of acids selected from the group consisting of fumaric, lactic, tartaric and citric acids in combination with fatty acids or fatty alcohols, esters of acids selected from the group consisting of fumaric, lactic, tartaric, citric, acetic and succinic acid in combination with mono or diglycerides, or a combination thereof and the like. The emulsifier, if present, is present in an amount effective to emulsify the components of the composition, for example, in amounts ranging from about 0.05 to about 5%, e.g. from about 0.1 to about 1% by weight.

The composition may also include a flavourant. Suitable flavouring agents include dextrose, monosodium glutamate, yeast hydrolysates, spice extracts including but not limited to, onion, garlic, chilli, seaweed, ginger, capsaicin, turmeric, celery, egg and simulated egg flavours, pepper, and the like, and salt and the like. Other flavourants which may be desirable for some simulated egg food products include, for example, vanilla, cinnamon, nutmeg, chocolate, honey and butter (which would be especially useful in sweet applications). If present, the flavourant(s) is/are present in flavouring effective amounts, such as from about 0.1% to about 10% (w/w), e.g. from about 0.2% to about 5% (w/w).

The composition may also include a colourant, which may be important for marketing and to assist with consumer acceptance of the product. Suitable colouring agents include flavonoids, phenols, carotenoids, xanthophylls, chlorophyll, betalaines, FD&C Yellow No. 5, or any similar FDA approved colour, e.g., Durkee's "Egg shade". If included, the colouring agent is present in trace amounts, such as from about 0.01% to at most about 5% by weight, e.g. from about 0.1% to about 2% by weight, e.g. from about 0.5% to about 1% by weight.

The composition may also include an antioxidant in order to increase the shelf-life of the product and prevent rancidity from occurring. Antioxidants known in the art may be used, including tocopherols, ascorbate, vitamin E, sulphites, EDTA, gallates, phenols and the like. If present, they are present in anti-oxidant effective amounts, e.g. less than about 1% by weight. As described above, soy materials including PSM often include vitamins such as vitamin E, which is a very powerful antioxidant. Such vitamins can become intimately mixed throughout the composition, and especially when it includes an oil.

The composition may also include a stabiliser (which may function in a similar manner to an emulsifier). Stabilizers may comprise one or a plurality of constituents which serve to emulsify as well as to stabilize the product. Examples include, but are not limited to, vegetable gums, e.g., xanthan gum, locust (carob) bean gum, agar gum, carrageen, guar, gum tragacanth, each of which may optionally be mixed with dextrose, certified starch, carrageen and mono and diglycerides. If present, the stabilizer is present in stabilizing effective amounts, ranging, for example, from about 0.1 to about 1.5% by weight of the composition.

The composition may also include a vitamin or a mineral. The vitamin components may, for example, include Vitamin A, B, E and the like. Exemplary minerals include calcium, potassium, phosphorous, magnesium, sulphur and sodium and the like (these may also be present in their salt forms or organic chelate forms). If present, the vitamin or mineral components are included in an amount of from about 0.01% to about 0.5% by weight of the composition.

The composition may also include a preservative in order to increase the shelf-life of the product. Preservatives are especially likely to be required in hydrated liquid forms of the present invention. Any suitable food grade preservative may be used, with specific examples of suitable preservatives including potassium sorbate, sodium benzoate, methyl paraben, propyl paraben or combinations thereof. If present in the composition, they are in an amount effective to preserve the composition, which is typically less than about 1% (w/w).

Alternately, hydrated liquid forms of the composition may be microbiologically stabilised using non-thermal processing methods such and hyperbaric pressure processing followed by chilled storage.

Additional mineral supplements, such as trace amounts of calcium, zinc and other trace elements, and/or additional vitamins may be added to the composition of the present invention, where such may be beneficial. Some sources of minerals are contained in acidulating substances, and this would need to be taken into account to ensure that their addition to the composition did not adversely affect its functionality or the organoleptic properties of the resultant food product.

The composition may also include shelf-stable probiotic and prebiotic components and/or other nutrition enhancing ingredients. If present, they are present in effective amounts, e.g. less than about 1% (w/w).

In other aspects, the present invention relates to methods for producing a cooked egg-free simulated egg food product. In one aspect, for example, such a method comprises the steps of:

mixing whey protein, a soy material comprising a lipoxygenase inactivated soy flour, a pH agent effective to alkalinise the composition upon hydration and, optionally, an oil, to produce a dry mixture;

mixing the dry mixture with a liquid; and cooking the mixture, whereby cooked egg-free simulated egg food product having organoleptic properties similar to those of the egg food product if formed using hen eggs is produced.

In another aspect, the method may comprise the steps of:
mixing:
   between about 28 and about 70% w/w whey protein;
   between about 15% w/w and about 50% w/w of a lipoxygenase inactivated soy flour;
   between about 0.2% w/w and about 1.8% w/w of a pH modifying agent effective to alkalinise the composition upon hydration; and
   optionally, an oil,
to produce a dry mixture;
mixing the dry mixture with a liquid; and
cooking the mixture, whereby a cooked food egg-free simulated egg food product having organoleptic properties similar to those of the egg food product if formed using hen eggs is produced.

In yet other aspects, the present invention relates to methods for producing an uncooked egg-free simulated egg food product (e.g. a mayonnaise or beverages which traditionally contain uncooked hen's eggs). Such a method may, for example, comprise the steps of:
   mixing whey protein, a soy material comprising a lipoxygenase inactivated soy flour, a pH agent effective to alkalinise the composition upon hydration and, optionally, an oil,
   to produce a dry mixture; and
   mixing the dry mixture with a liquid.

The dry ingredients and oil, if present, may be mixed using any suitable technique in order to produce a powder "dry-mix", which has a free flowing crumb-like admixture. The inventors have found that embodiments of the compositions of the present invention prepared in this manner can be surprisingly resistant to oxidation and rancidity, possibly because of the protective effects of the oil (both because it coats the particles in the composition and also because the oil is capable of being able to carry antioxidants, etc.). In embodiments of the invention including PSM, the antioxidants contained therein may also impart protection to the admixed foods.

Ideally, the particles in the powder have a small particle size such that the product has a smooth mouth feel, that is, no particulate sensation can be perceived in the mouth, which is a characteristic of egg-based foods such as omelettes, scrambled eggs, egg custards and the like. The average particle size of the components of the composition is therefore ideally less than about 100 microns, e.g. less than about 50 microns, e.g. less than about 40 microns, e.g. less than about 30 microns, e.g. about 20 to about 30 microns. While particle sizes may show some variation in size in any given batch, the average particle size of the particles in the compositions of the present invention is generally less than about 50 microns, etc. Particle size may be readily determined using methods well known in the art. When referring to particle size it is meant that the distance between two points of an imaginary line that extends to the opposite sides of the particle, which line must pass through the middle of the particle. For example, if the particle is a sphere, the average particle size refers to the diameter of the particle.

The component in the compositions of the present invention which is most likely to have particles that might impart a grainy mouthfeel to the resultant simulated egg food product is the soy material (at least some of which is provided in the form of a soy flour). Thus, in some embodiments, a mechanical treatment of the soy material (e.g. PSM) may be carried out before admixture with the other components of the composition. Alternatively, an admixed composition—oil mix may be mechanically treated in order to render its particle size as fine as possible, down to a particle size where the composition's particles are both relatively instantly hydratable and also rendered non reclumping (i.e. free of particulate aggregation). Such size reduction is typically carried out to the extent that the product has a smooth mouth feel, that is, no particulate sensation can be perceived in the mouth.

The resultant refined dry product, when mixed with an aqueous liquid such as water e.g. at about room temperature (24° C./75° F.), reconstitutes rapidly to form the hydrated composition. The expression "readily hydrated" is meant to indicate that on addition of a specified amount of water at room temperature or 24° C. (75° F.) the blended dry product becomes fully dispersed/dissolved by mixing for about 20-60 seconds.

Once so-formed, the composition may be incorporated into any recipe or food that normally contains eggs in order to fully replace the egg component. For example, the composition of the present invention may be suitably seasoned and cooked to produce an omelette, fried egg, scrambled eggs, boiled egg, poached egg, steamed egg and the like. Alternatively, the composition of the present invention may be added to foods, in which eggs are traditionally utilized, such as baked egg custards, pouring custards, desserts and the like, or in a quiche, crepe, pancake or waffle, in bakery products such as muffins, cakes, cookies and yeast-leavened products like breads, as a binder in fritters, in batters, mayonnaise, salad dressings, hot or cold beverages, e.g., egg nog, spreads, sauces and nutritional products or supplements and in any other way one uses normal fresh eggs. When added to foods, the hydrated composition of the present invention may be used in the same way as hen's eggs; it just replaces the egg. Ideally, the composition is added to the other ingredients in the same amount as the natural egg, and the simulated egg food product is prepared in the same way as the product containing the natural egg.

Another beneficial feature of the present invention is that the hydrated composition does not require cooking prior to consumption. As the composition is shelf stable, the ingredients are of very low microbial load and cannot carry avian related diseases, which are clear advantages over fresh eggs. For example, for the preparation of a mayonnaise product, no cooking is required and the present invention can be used to simulate egg yolk. Another example where uncooked egg may be required is in egg milk shakes.

Thus, compositions of the present invention can be used to completely replace hen's eggs, which may be beneficial for the reasons described above.

Many whole egg recipes involve the separate cooking features of the egg yolk or the egg white. As noted above, the inventors have surprisingly discovered that the present invention allows for a gradation of white to yolk features to be displayed in the prepared food products. For example the relative proportion of PSM may be increased and that of the whey protein decreased in a composition in order to attain a simulated cooked egg yolk texture and composition. This composition can be modified with the addition of natural colours such as tocopherols, carotenoids, lutein and other pigments to achieve the actual colour and nutrition of natural egg yolk. This simulated egg yolk composition can be admixed along with an uncoloured dry mix composition formulated to have relatively lower levels of PSM and higher amounts of whey protein isolate and when cooked (together or separately) a natural mix of egg white albumin and yellow yolk can be simulated.

In another aspect of whole egg simulation, two pre-mixes in accordance with the present invention may be hydrated separately and formed into suitable moulds to produce a yellow centre surrounded by a white halo, which is subsequently cooked to form a whole egg like food. Co-extrusion cookers could also be used to achieve a continuous production line and the resultant simulated whole cooked eggs chilled or frozen for use in food service as simulated an egg white and egg yolk for cooking by steaming, coddling or frying.

By way of example, a whole egg may be simulated using a dry-mix composition including about 36% w/w PSM and about 45% w/w WPI. In contrast, an egg white simulating composition may include about 18% w/w PSM and about 67% w/w WPI, whilst an egg yolk simulating composition may include about 40% w/w PSM and about 39% w/w WPI. For a simulated egg food product having a softer yolk, a composition including about 50% w/w PSM and about 28% w/w WPI is suitable. Varying the proportions of the PSM/WPI (and, more generally, soy material/whey protein) in any given composition can result in compositions having cooking features similar to those of hens' egg yolk or white.

EXAMPLES

Specific embodiments of the present invention will be described below in the context of traditional and very popular egg recipes such as omelettes, scrambled eggs, custards and the like. When fresh whole eggs are cooked into the traditional omelettes recipe, they exhibit special heat setting properties resulting in the ability to form a rolled shape of light and increased volume with a delicate and tender set texture that retains moisture and mouthfeel and flavour of freshly cooked hen eggs.

Generally speaking, preparation of the simulated egg food product of the present invention by the consumer involves adding a given quantity of water (or other aqueous liquid, e.g. milk or stock) to the composition with mixing. The resultant liquid or batter may then be cooked like a traditional omelette by heating the skillet until added cooking fat (e.g. margarine or butter) sizzles but does not brown, pouring an appropriate volume of the in the hydrated composition into the skillet and, when it begins to heat set at its base, begin rolling the omelette, flipping it to seal the seam. Finally, the cooked simulated omelette may be served with salt and pepper toppings to taste. Various degrees of browning can be achieved by the usual methods employed by the everyday cook. Addition of other foods typical of favourite omelette recipes are fully compatible with the egg-like food products, including addition of vegetables, cheeses, flavours, colours, spices, herbs, mushrooms, meats and the like.

Other cooking methods possible with the compositions of the present invention include traditional recipes for scrambled eggs, fried eggs, cakes, baked and pouring custards frittata, soufflé, pancakes, crepes, bread, pudding, cookies, soups, sauces, tarts.

Examples of specific embodiments in accordance with the present invention will now be described.

Example 1

The following example demonstrates the preparation of an egg-like food composition and resultant simulated egg food product in the form of a typical omelette, popularly made from whole eggs, but here made using a method in accordance with an embodiment of the present invention.

TABLE 3

| INGREDIENTS | % w/w |
|---|---|
| Whole Soy Flour (PSM) | 36.7 |
| Whey Protein Isolate | 46 |
| Sodium Bicarbonate | 1 |
| Tri-potassium Phosphate | 0.3 |
| Sunflower Oil | 16 |
| ƒ | 100.00 |

The composition is prepared from the ingredients in Table 3. The powder ingredients are evenly combined, sieved and optionally refined. The dry powder ingredients are blended in a bowl mixer and the lipid ingredient added to combine completely and evenly. To a 25 g aliquot of the blended dry ingredients composition in a mixing bowl, 75 g of cold tap water was added and whisked by hand using a kitchen fork for one minute or an electric stick mixer (e.g. Bamix) for about 20 seconds until the blended powders and water form a wet and somewhat thickened solution. The presence of some small lumps is not a problem.

A non-stick surface omelette skillet is preheated on the stove top to about half to two thirds maximum heat and some butter (or optionally vegetable oil or margarine) is added (1.5 g) and once melted to coat the hot pan and sizzling, the egg-like mixture is poured into the pan. The mixture is allowed to coat the entire pan surface and begins to solidify as the heat permeates the mixture like a typical egg omelette. At about 1.5 minutes into cooking, while some of the mix is not yet set, the omelette mixture is ready to roll into a cylinder in the normal way and is then left for 10-15 seconds more to finish before turning out onto a serving plate.

The external skin (pan-side cooked) of the omelette can take on a very slight to no browning colour over a light yellow as is seen with egg omelettes, depending on preference by the cook. The inside of the rolled omelette is tender and moist and a semi firm curd although with further cooking time it would become tender and firm throughout. This is a preference for the consumer's taste. When cut, the cross-section appearance is slightly aerated set composition resembling a normal whole egg omelette. The texture of the omelette is slightly resilient to touch but soft and tender to eat. The cooked omelette clears the mouth easily with no evidence of any powder taste from the ingredients, no sponginess or curdled textures and no sour notes or vegetal, beany flavours (which may often be found with soy materials). The flavour of the omelette was typical of whole cooked eggs. The pH of the egg mixture was neutral to slightly alkaline, similar to eggs.

Example 2

The following example demonstrates the preparation of an egg-like food product made using a method in accordance with an embodiment of the present invention using flavour additions and to demonstrate the beneficial effects which may be obtained by using PSM whole soy flour.

TABLE 4

| INGREDIENTS | % w/w 2A | % w/w 2B | % w/w 2C |
|---|---|---|---|
| Whole Soy Flour (PSM) | 36 | 0 | 15.3 |
| Soy Protein Isolate | 0 | 19.6 | 12.4 |
| Whey Protein Isolate | 45 | 45 | 45 |
| Sodium Bicarbonate | 1 | 1 | 1 |

TABLE 4-continued

| INGREDIENTS | % w/w 2A | % w/w 2B | % w/w 2C |
|---|---|---|---|
| Tri-potassium Phosphate | 0.3 | 0.3 | 0.3 |
| Glucose | 1 | 1 | 1 |
| Emulsifier | 1 | 1 | 1 |
| Flavour | 0.3 | 0.3 | 0.3 |
| Sunflower Oil | 10.4 | 10.4 | 10.4 |
| Palm Fruit Oil | 5 | 5 | 5 |
| $f$ | 100.00 | 100.00 | 100.00 |
| Soy protein concentration in powders | 13.7 | 18 | 18 |

The powder ingredients in each sample in Table 4 were evenly combined as in Example 1. To 25 g of each of the blended dry powder ingredients in a separate mixing bowl, sequentially 80 g of cold tap water was added and whisked by hand using a kitchen fork for about 60 seconds until the powders and water form a wet and somewhat thickened solution as in Example 1. Meanwhile a skillet was preheated on an electric stove top to about two thirds maximum heat, 1.5 g vegetable oil added and heated to cover the pan surface. Each mixture was cooked as in Example 1. A traditional omelette was made by mixing two 50 g hen eggs and cooking in the same way as above.

Sample 2A resulted in an egg-like omelette in accordance the present invention, having a colour identical to the hen egg omelette and a texture that was almost the same, being springy on the outside and creamy and moist on the inside. The volume was increased like the egg omelette. The flavour of the omelette was very similar to the egg omelette. Some salt and pepper was added to the top of both the hen egg omelette and the egg-like omelette and they tasted very similar.

For Sample 2B, all the PSM whole soy flour was replaced with soy protein isolate to give a similar soy protein level. On cooking, however, there was splitting evident, it was difficult to form a rolled omelette, liquid exuded from the cooked product showing syneresis. The texture was not springy and there was no volume increase. On tasting, the texture was spongey, and curdled in the mouth, was not a clean taste and was hard to swallow as it formed a pulp in the mouth. The colour was a drab buff brown and it smelt and tasted beany and was unacceptable.

For Sample 2C, part of the soy protein isolate was replaced with PSM whole soy flour. This improved the performance on cooking with less splitting, but there was still syneresis, the texture was softer than sample 2A but firmer than sample 2B. On tasting, it formed a pulp in the mouth and liquid exuded leaving a spongey pulp in the mouth which was hard to swallow and was unacceptable.

Samples 2B and 2C, not having organoleptic properties similar to the omelette prepared using hen's eggs, as described above, are therefore not in accordance with the present invention. This example demonstrates the utility of the PSM whole soy flour in compositions such as these. In compositions such as these, the PSM cannot be totally replaced with soy protein isolate because it detracts from the egg-like setting characteristics, organoleptic properties and cannot provide an omelette having the same quality as in Sample 2A.

Example 3

The following example demonstrates the preparation of an egg-like food product made using a method in accordance with an embodiment of the present invention to demonstrate the functional attributes of the various ingredients.

TABLE 5

| INGREDIENTS | % w/w 3A | % w/w 3B | % w/w 3C | % w/w 3D | % w/w 3E |
|---|---|---|---|---|---|
| Whole Soy Flour (PSM) | 38 | 73 | 49 | 32 | 29.9 |
| Whey Protein Isolate | 45 | 10 | 24 | 50 | 0 |
| Whey Protein Concentrate 34% | 0 | 0 | 5 | 0 | 0 |
| Whey Protein Concentrate 80% | 0 | 0 | 5 | 0 | 49.7 |
| Sodium Bicarbonate | 1 | 1 | 1 | 1 | 1 |
| Sunflower Oil | 16 | 16 | 16 | 16 | 16 |
| Emulsifier | 1 | 1 | 1 | 1 | 1 |
| $f$ | 100 | 100 | 100 | 100 | 100 |
| Whey protein concentration Powder | 40.5 | 8.9 | 27.3 | 45 | 39.8 |
| Whey protein concentration Batter | 10.0 | 2.2 | 6.5 | 10.7 | 10.4 |

The powder ingredients in Table 5 were evenly combined as in Example 1. To 25 g of each sample of the blended dry powder ingredients A to E in separate mixing beakers, sequentially 80 g of cold water was added and whisked by hand using a stick blender for about 30 seconds until the powders and water form a wet and somewhat thickened batter. Meanwhile a skillet for each sample was preheated on the stove top and 1.5 g oil added as in Example 1. The omelettes were made as is Examples 1 and 2.

Sample 3A was very easy to roll, did not brown excessively or stick to the pan, had a springy outer texture with good volume and moist internal texture with excellent curd appearance and no syneresis. The simulated omelette was also tender to the taste.

Sample 3B omelette did not set firm, was liquidy and very curdy in centre, very fragile and unacceptable, showing there was not enough whey protein present.

Sample 3C browned fast, was harder to roll, and had a puffy and softer texture. The centre was wet and pulpy with syneresis evident.

Sample 3D formed an omelette but was too tough and had rubbery texture. The centre of the food product was not creamy or moist, and was more like egg white.

Sample 3E used whey protein concentrate (WPC80%) instead of whey protein isolate and the batter was uneven and a paste settled out because WPC80 does not suspend as well as WPI. The batter tended to brown more easily and form a soft less firm omelette, but looks curdy and more uneven and slightly dry.

This example shows that there is a requirement of a range of whey protein content from about 7 to 10% w/w in the omelette batter, and preferably coming from whey protein isolate for best texture and heat setting. Above 10% whey protein content results in too tough a set characteristic without any moist creamy texture whilst below 7% whey protein content there is not adequate setting or stability of the omelette. The preferred range of PSM in the batter is from about 9 to 13.5%. The preferred ratio of PSM to WPI is about 1:1.23 and in the range of 1:2.69 to 1:0.68.

Example 4

The following example demonstrates the preparation of an egg-like food product made using a method in accordance with an embodiment of the present invention to demonstrate the functional attributes of the various pH modifying agents and other salt ingredients.

TABLE 6

| INGREDIENTS | % w/w 4A | % w/w 4B | % w/w 4C | % w/w 4D | % w/w 4E |
|---|---|---|---|---|---|
| Whole Soy Flour (PSM) | 31.3 | 31.0 | 31.6 | 31.3 | 31.5 |
| Whey Protein Isolate | 50 | 50 | 50 | 50 | 50 |
| Dextrose monohydrate | 1 | 1 | 1 | 1 | 1 |
| Sodium Bicarbonate | 1 | 1 | 0.5 | 0 | 1 |
| Tri-potassium Phosphate | 0.3 | 0.3 | 0.3 | 0.3 | 0 |
| Sodium chloride | 0 | 0.5 | 0 | 0 | 0 |
| Sunflower Oil | 10.4 | 10.4 | 10.4 | 10.4 | 10.4 |
| Red Palm Fruit Oil | 5 | 5 | 5 | 5 | 5 |
| Emulsifier | 1 | 1 | 1 | 1 | 1 |
| ∫ | 100 | 100 | 100 | 100 | 100 |
| pH of batter | 7.96 | 7.62 | 7.14 | 6.20 | 7.40 |

Omelettes were prepared for each sample as per Example 2.

Sample 4A formed a good springy omelette of good volume but slightly firm due to the higher WPI compared with Sample 2A. Sample 4A was the preferred composition (of Samples 4A to 4E) for forming a simulated omelette. When the sodium bicarbonate and tri-potassium phosphate in Sample 4A was replaced with 1% disodium hydrogen phosphate (a weak buffering alkali) in the composition (results not shown), the resultant pH of the batter was 6.66 and on cooking it split with a great deal of syneresis and formed a wet curd, which was hard to form an omelette shape. The taste was spongey and difficult to swallow and unacceptable. However, when Sample 4A had the TKP replaced with 1% disodium hydrogen phosphate, a good product was achievable.

Sample 4B cooked more like a crepe and its appearance was even, but it tended to stick. It had a residual grainy taste but its salt taste was nice. The presence of a relatively high amount of salt (i.e. NaCl) seemed to toughen the gel of the omelette in a negative way causing graininess and destabilisation of the gel matrix.

Sample 4C did not set well and was softer and more uneven in appearance. It was also very fragile and broke when rolled. It had a soft grainy texture and was less appealing. When the TKP level in Sample 4C was increased to 1.5%, the pH of the batter was 7.48 and the omelette texture was improved to that of Sample 4A except the flavour had become bitter due to the potassium. When 0.5% potassium bicarbonate was added to Sample 4C composition, the resultant food product was a bit more crumbly in the mouth and the taste was not as clean, although a reasonable omelette was achieved. When all the sodium bicarbonate was replaced with potassium bicarbonate at 1% of the powders, the batter pH was 7.44 and the cooked omelette formed a reasonable product, but one which had a softer texture and was less springy, more curdy and dry.

In Sample 4D, which had no sodium bicarbonate added, the pH of the batter dropped to 6.20 and on cooking it split and did not amalgamate and could not form an omelette shape. The texture was grainy and pulpy and unacceptable. The pH of the batter was much lower than the other samples with twice the sodium bicarbonate content, showing there is a lower limit to the pH of the batter to give a proper gelation and omelette set texture and stability. In these formulations the threshold pH is about 7.15, below which the omelette will not set.

In Example 4E, the formulation was identical to Sample 4A except no Tri-potassium Phosphate was added. The omelette tended to stick to the pan but an omelette could be rolled, although it was softer than Sample 4A and more mushy. Sample 4A (having both pH modifying salts, sodium bicarbonate and tripotassium phosphate present) was preferred and most resembled a simulated omelette.

Example 5

The following example demonstrates the preparation of an egg-like food product made using a method in accordance with an embodiment of the present invention to demonstrate the textural attributes of the various ingredients to form egg yolk-like and egg white-like products.

TABLE 7

| INGREDIENTS | % w/w 5A | % w/w 5B |
|---|---|---|
| Whole Soy Flour (PSM) | 18.6 | 37.9 |
| Whey Protein Isolate | 67 | 40.6 |
| Sodium Bicarbonate | 1 | 1 |
| Tri-potassium Phosphate | 0.3 | 0.3 |
| Glucose | 1.5 | 1.5 |
| Sodium Chloride | 0.3 | 0.3 |
| Emulsifier | 1 | 1 |
| Flavour | 0.3 | 0.4 |
| Sunflower Oil | 10 | 10 |
| Palm Fruit Oil | 0 | 6 |
| Paprika Extract | 0 | 0.01 |
| ∫ | 100.00 | 100.00 |

The powders of Sample 5A were blended and 25 g was mixed with 85 g of cold tap water in a bowl by blending with an electric stick mixer (Bamix) for 20 seconds. The batter was poured into a preheated and oiled fry pan and cooked to form an omelette made from egg whites. Another 33 g portion of batter was placed into a preheated and oiled pan and egg ring and fried for 2 minutes and the resultant product resembled a fried egg white in appearance, texture and taste. Another 33 g portion of batter was cooked in a preheated and oiled coddling mould in a simmering water bath with lid on for 3 minutes and the resultant product resembled a steam cooked egg white in texture, appearance and taste.

The powders of Sample 5B were cooked as for Sample 5A and the resultant products resembled real cooked hen yolks in appearance texture and taste. The product had a soft texture and rich yolk like flavour and it set well, but was shorter in texture and not as springy and Sample 5A.

A simulated whole cooked egg was cooked by taking 33 g of Sample 5A batter and 17 g of Sample 5B batter. The 33 g portion of Sample 5A batter was partially cooked in a preheated and oiled coddling mould in a simmering water bath with lid off for 1.5 minutes when the 17 g of Sample 5B was poured into the yet un-cooked centre of Sample 5A and the lid replaced and product finished cooking for a total of 6 minutes. The resultant product resembled a cooked egg white with its egg yolk in the centre. The texture and taste of the product resembled a real hen egg.

Example 6

The following example demonstrates the preparation of a simulated egg food product made using a method in accordance with an embodiment of the present invention to demonstrate the nutritional attributes of the various ingredients.

A nutritional analysis of an egg-free simulated omelette in accordance with Example 2A as a representative of a simulated egg food product of the present invention compared with typical commercial hen eggs (for example: Ecoeggs.com.au) is shown in Table 8A. For ease of comparison, the data for Example 2A has been presented to approximate the same energy from 100 g of hen eggs (about 550 kJ).

TABLE 8A

Comparison of Hen Eggs to Example 2A Simulated Egg Food Product.

| per serve | Hen Egg | % Daily Values | Example 2A | % Daily Values |
|---|---|---|---|---|
| grams | 100.00 | | 115.59 | |
| Energy (kJ) | 550.00 | 6.32 | 550.00 | 6.32 |
| Protein | 12.20 | 24.40 | 14.60 | 29.20 |
| Total fat | 12.50 | 19.23 | 6.86 | 16.23 |
| Saturated | 3.40 | 17.00 | 0.87 | 4.19 |
| Trans | 0.00 | no DV | 0.00 | no DV |
| Polyunsaturated | 2.00 | no DV | 4.04 | no DV |
| Mono | 5.10 | no DV | 1.54 | no DV |
| Cholesterol | 375.00 | 125.00 | 0.00 | 0.00 |
| Total Carbohydrate | 1.30 | 0.43 | 2.19 | 0.70 |
| Sugars | 0.30 | no DV | 1.99 | no DV |
| Calcium (mg) | 39 | N/A | 107.80 | N/A |
| Sodium (mg) | 136.00 | 5.67 | 137.90 | 5.53 |

There are some significant macro-nutritional advantages to the product of the present invention. For example: the protein level of the simulated omelette of Example 2A is about 20% higher than eggs; the fat content is 45% lower than eggs and the P/M/S ratio is low in saturates and high in polyunsaturates; there is no cholesterol present and there is a good amount of calcium. Furthermore, all of these parameters can easily be changed depending on the requirement of the consumer.

The quality of protein in foods is related to their essential amino acid composition and digestibility. Proteins of high quality will contain all the essential amino acids at levels greater than accepted ideal protein reference levels (see below) and have a digestibility equal or greater than those of egg white or milk proteins. Although animal proteins are better quality than plant proteins (as plant proteins often lack certain essential amino acids), surprisingly the inventors have found that a careful combination of fully functional soy flour (PSM) with whey protein products can exceed the ideal protein reference in terms of limiting essential amino acids and still achieve a simulated whole egg or egg white or egg yolk functionality in cooking. It is also known that that the protein availability is also dependent on the microflora of the gut (Eggum et al British Journal of Nutrition (1985), 54, 727-739) and the inclusion of dietary fibre such as from whole soy bean flour preparations like PSM provides prebiotics for improvement of beneficial gut flora.

To predict the protein quality of simulated food products in accordance with the present invention, the inventors analysed their essential amino acid composition. The FAO of the United Nations, Rome, 2013 published a report called the "Dietary protein quality evaluation in human nutrition, 2011 Expert Consultation, FAO Food and Nutrition Paper 92", which identified key findings for dietary protein quality and dietary amino acids as nutrients and their digestibility or bioavailability index as indicators of the available nutrition of foods. The Digestible Indispensable amino acid score: DIAAS %=100×[(mg of digestible dietary indispensable amino acid in 1 g of the dietary protein/(mg of the same dietary indispensable amino acid in 1 g of the reference protein)])

Because eggs are eaten throughout the world as a basic and highly nutrient rich food the inventors compared the essential amino acid composition of 100 g indicative formulation of an egg-like food product made from Example 2A with that of whole eggs and compared to the Ideal FAO 2011 list of essential amino acids.

As can be seen from Table 8B, Sample 6A (which is the same as Sample 2A) had a total EAA content of 46.6% of total protein and this was 60% greater than the Ideal Protein and approached that of whole eggs. Based on a serving of whole eggs based on energy provided of 550 kJ, Sample 6A contained 7.89% which was very close to whole egg at 8.65%.

TABLE 8B

Essential Amino Acid Composition as Percentage of Proteins

| EAA as % protein | Histadine | Iso-leucine | Leucine | Lysine | Met + Cys | Phenylalanine + Tyr | Threonine | Tryptophan | Valine | total EAA as % of protein | EAA per egg energy equivalent (550 kJ) |
|---|---|---|---|---|---|---|---|---|---|---|---|
| Sample 6A | 3.00 | 5.10 | 8.20 | 6.80 | 3.30 | 9.50 | 4.10 | 1.40 | 5.20 | 46.60 | 7.89 |
| Whole Egg | 3.08 | 8.33 | 11.42 | 8.92 | 5.75 | 12.33 | 6.92 | 2 | 9.33 | 68.08 | 8.65 |
| Ideal FAO 2011 | 1.60 | 3.00 | 6.10 | 4.80 | 2.30 | 4.10 | 2.50 | 0.66 | 4.00 | 29.06 | N/A |

Example 7

The following example demonstrates the preparation of an egg-like food product for savoury applications made using a method in accordance with an embodiment of the present invention to demonstrate the functional attributes in scrambled eggs.

TABLE 9

| INGREDIENTS | % w/w |
|---|---|
| Whole Soy Flour (PSM) | 35.4 |
| Whey Protein Isolate | 45 |
| Sodium Bicarbonate | 1 |
| Tri-potassium Phosphate | 0.3 |
| Glucose | 1 |
| Emulsifier | 1.5 |
| Flavour | 0.4 |
| Vegetable Oil | 10 |
| Shortening | 5 |
| Paprika Extract | 0.2 |
| Lutein Extract | 0.2 |
| f | 100.00 |

For an equivalent of three whole eggs, blend by whisking 37.5 g of dry mix of Table 9 with 120 g water in a bowl. Heat 4 g margarine in a small non-stick saucepan until sizzling.

Pour in batter and stir gently over low heat for 1-2 minutes until lightly set but still very moist and creamy. The resultant product had an appearance, texture, colour and taste of scrambled natural hen eggs.

Example 8

The following example demonstrates the preparation of an egg-like food product for sweet applications made using a method in accordance with an embodiment of the present invention to demonstrate its functional attributes in baked custard.

In a bowl, 25 g of the blended powder of Table 9 was added to 80 g of water and the mixture blended with a stick mixer (e.g. Bamix) for 20 seconds. 120 g of milk was warmed in a saucepan to simmering temperature (about 70° C.) and removed from heat. To the warm milk ⅓ of the liquid mixture from Example 7 was added and mixed, and then blended together with 17 g powdered sugar, 0.2 g salt, 0.02 g nutmeg powder and 0.5 g vanilla extract.

Custard moulds were filled with 100 g of the custard mixture and placed in a baking pan water bath and baked in a pre-heated oven at 160° C. for 50 minutes. The custards were removed from the oven and served either warm or cold. The resultant baked custards had a tender moist soft set curd, did not split and had a slightly brown surface, similar to normal egg custards. The texture was silky smooth and tender and flavour similar to a baked custard from made eggs.

Example 9

The following example demonstrates the preparation of an egg-like food product for sweet applications made using a method in accordance with an embodiment of the present invention to demonstrate its functional attributes in cakes.

A typical muffin recipe was used except that the whole hen egg content was substituted with the egg-like food product made from the preparation in Table 9 by blending 12.5 g of powder with 40 g cold water (one egg equivalent). The following was stirred together in a large bowl: 250 g self-raising flour, 2 teaspoons of baking powder, ½ teaspoons salt, 150 g caster sugar. One cup of milk was added to the 1 egg equivalent egg-like food product with 3 tablespoons of vegetable oil and this was stirred into the flour to form a think batter. The batter was portioned into 6 large muffing moulds and baked for 25 minutes in a pre-heated domestic oven at 200° C. The muffin cakes had excellent oven spring after 8 minutes and formed large well set caked of equivalent crumb texture, density and taste compared with muffins made from real hen eggs.

Example 10

The following example demonstrates the preparation of an egg-like food product for spread applications using a simulated egg yolk composition made using a method in accordance with an embodiment of the present invention to demonstrate its functional attributes in mayonnaise.

TABLE 10

| INGREDIENTS | % w/w |
| --- | --- |
| Whole Soy Flour (PSM) | 50 |
| Whey Protein Isolate | 28 |
| Sodium Bicarbonate | 0.2 |
| Sugar | 2 |
| Salt | 0.3 |
| Pepper | 0.05 |
| Sunflower Oil | 12 |
| Palm fruit oil | 6 |
| Lecithin | 0.75 |
| Flavour | 0.5 |
| Colour | 0.2 |
| ƒ | 100 |

The dry composition of Table 10 was prepared as in Example 1 and an equivalent of three large egg yolks was prepared by blending 15.3 g dry powder with 45.9 g water. The mixture was placed in the bowl of an electric mixer with whisk attachment and to this 1 g mustard powder was mixed in. Then 100 g sunflower oil was slowly trickled into the mixture to form a thick emulsion. Lastly, 10 g of 10% vinegar was added and mixed in and the blend finally homogenised before packing in an air tight jar. The resultant mayonnaise had a pleasant egg-like flavour and ultra-smooth consistency identical to traditional mayonnaise.

Example 11

The following example demonstrates the preparation of an egg-like food product for sauce applications using a simulated egg yolk composition made using a method in accordance with an embodiment of the present invention to demonstrate its functional attributes in a cooked hollandaise sauce.

The dry composition of Table 10 was prepared as in Example 1 and an equivalent of three large egg yolks was prepared by blending 15.3 g dry powder with 45.9 g water. The mixture was placed in the pre-warmed bowl of a double boiler on low simmer and hand whisked with 30 g of water until it thickened. Progressively over 8-10 minutes, 150 g of cubed butter at room temperature was added and whisked to incorporate and emulsify. When all the butter was added the thickened sauce was removed from the heat and 50 g lemon juice gently blended in. Finally, the sauce was seasoned with salt and pepper.

The resultant warm sauce was of a smooth creamy pourable consistency and tasted of rich eggs and lemon. It was noted that the sauce had better stability during preparation and on storage than a traditional hollandaise sauce, presumably due to the starch and emulsifier content of the soy material used.

Embodiments of the composition of the present invention, and egg-like food products produced therefrom may have one or more of the following advantages:
  completely egg-free, but having culinary functionality and organoleptic properties that closely simulate those of equivalent food products made from real eggs;
  a heat set capability to simulate freshly cooked pure whole hen egg food products like omelette, quiches and scrambled, fried, poached, coddled, steamed and microwaved eggs;
  can simulate separately cooked hen egg yolk and whites;
  may be used in bakery products such as muffins and cakes, in custards and other dessert uses, in mayonnaises and the like, etc.;
  suitable for vegetarians;
  is lactose free, and free from added sulphites;

compatible with co-added shelf-stable nutrient ingredients like probiotics, prebiotics, vitamins, minerals, lutein, antioxidants, omega 3/DHA fatty acids, fibre, plant proteins, etc.;

has a nutritional composition similar to whole eggs;

substantially cholesterol free, and may therefore lead to reduction in blood serum cholesterol levels as part of a suitably balanced diet;

may be prepared at a lower fat content than whole eggs;

presented as a dry product which will rehydrate instantly on addition of cold water but may also be presented as a liquid product either refrigerated or frozen;

has a long shelf life (>12 months) in its dry form without the need for refrigerator or freezer storage;

is lower in cost than fresh or dried eggs (the inventors estimate a cost of about 11 cents per egg equivalent ex-factory compared to about 20 cents per real egg);

made from a short list of readily available (and relatively cheap) ingredients of organic status with a nutrition profile that approaches that of hen eggs;

the composition can be formed using an economical, low energy and simple manufacturing method, without requiring water addition; and the product has an essential amino acid profile that exceeds the FOA/WHO ideal protein and that it approaches than of hen eggs.

It will be understood to persons skilled in the art of the invention that many modifications may be made without departing from the spirit and scope of the invention.

It is to be understood that any prior art publication referred to herein does not constitute an admission that the publication forms part of the common general knowledge in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A composition for producing an egg-free simulated egg food product, the composition comprising:
   whey protein;
   a soy material comprising a lipoxygenase inactivated soy flour; and
   a pH modifying agent effective to alkalinise the composition upon hydration,
   wherein a simulated egg food product having organoleptic properties similar to those of the egg food product if produced using hen eggs is produced by hydrating and then cooking the composition.

2. The composition of claim 1, wherein the whey protein is whey protein isolate.

3. The composition of claim 1, wherein the composition comprises between about 28% w/w and about 70% w/w of the whey protein.

4. The composition of claim 1, wherein the soy material comprises a lipoxygenase inactivated soy bean cotyledon flour.

5. The composition of claim 1, wherein the soy material comprises processed soy material (PSM).

6. The composition of claim 1, wherein the composition comprises between about 15% w/w and about 50% w/w of the soy material.

7. The composition of claim 1, wherein a proportion of the whey protein to the soy material in the composition is between about 1.55:1.0 and about 0.66:1.0.

8. The composition of claim 1, wherein the pH modifying agent is selected from the group consisting of potassium bicarbonate, sodium bicarbonate, tri-potassium phosphate, di-sodium phosphate dihydrate and combinations thereof.

9. The composition of claim 1, wherein the pH modifying agent is effective to alkalinise the hydrated composition to a pH of between about 7.2 and 8.5.

10. The composition of claim 1, wherein the composition comprises between about 0.2% w/w and about 1.8% w/w of the pH modifying agent.

11. The composition of claim 1, further comprising an oil.

12. The composition of claim 11, wherein the oil is a vegetable oil.

13. The composition of claim 11, wherein the composition comprises from about 10% w/w to about 45% w/w of the oil.

14. The composition of claim 1, wherein the composition further comprises one or more of the following agents: sodium chloride, a sugar, an emulsifier, a flavourant, a colourant, an antioxidant, a stabiliser, a fibre, a vitamin and a mineral.

15. The composition of claim 1, wherein the composition is provided as a dry powder.

16. A liquid composition for producing an egg-free simulated egg food product, the liquid composition comprising the composition of claim 1 and a liquid.

17. A composition for producing an egg-free simulated egg food product, the composition comprising:
   between about 28% w/w and about 70% w/w whey protein;
   between about 15% w/w and about 50% w/w of a lipoxygenase inactivated soy flour;
   between about 0.2% w/w and about 1.8% w/w of a pH modifying agent effective to alkalinise the composition upon hydration; and
   optionally, an oil.

* * * * *